United States Patent Office 2,959,463
Patented Nov. 8, 1960

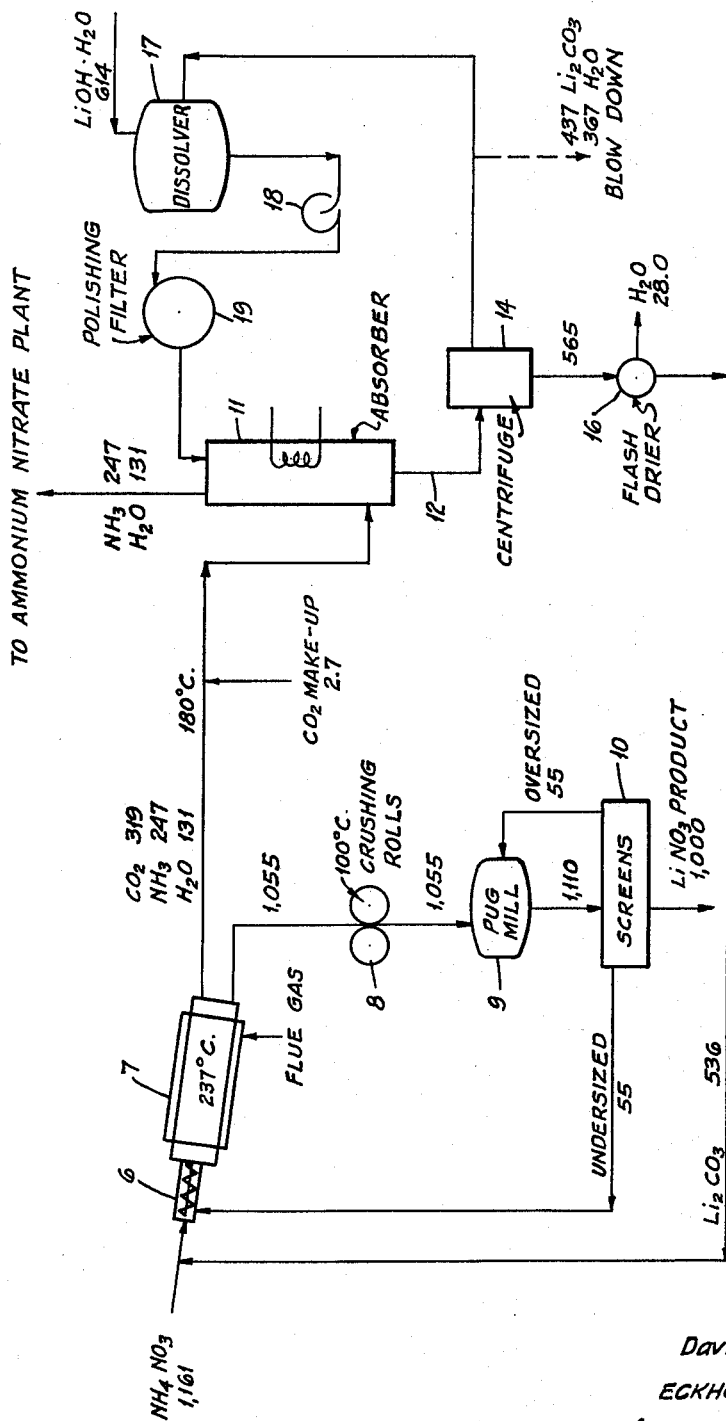

2,959,463
PROCESS FOR MANUFACTURE OF LITHIUM NITRATE

David R. Stern, Fullerton, Calif., assignor to American Potash & Chemical Corporation Filed July 3, 1957, Ser. No. 669,890

5 Claims. (Cl. 23—102)

This invention relates to a process for the preparation of anhydrous lithium nitrate.

Lithium nitrate is in increasing demand as a solid oxidizer in rocket propellants. It has a high available oxygen content, is extremely stable, melting at 225° C. It has a high density, and yields a rather high specific impulse since its flame temperature is high and the average molecular weight of its combustion products are low. Another advantage is that nitrogen, which has an extremely high dissociation temperature, is present as a combustion product, allowing higher flame temperatures.

Lithium nitrate forms low melting eutectics with other nitrates and this mixture is used for a metal heat treating bath or as a heat transfer medium (U.S. Patent 2,692,234). The thermodynamic properties of the hydrated form of this compound make it suitable for application in absorption refrigeration systems.

Mellor cites two methods of preparing lithium nitrate. They may be represented chemically as follows:

$$LiOH + HNO_3 \rightarrow LiNO_3 + H_2O \quad (1)$$

$$Li_2CO_3 + 2HNO_3 \rightarrow 2LiNO_3 + CO_2 + H_2O \quad (2)$$

In actuality one would use commercially available compounds such as aqueous nitric acid and $LiOH \cdot H_2O$. This reaction may be represented as

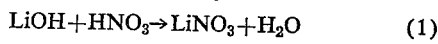

$$LiOH \cdot H_2O + HNO_3 x H_2O \rightarrow LiNO + (2+x)H_2O \quad (3)$$

Each of methods 1, 2 and 3 has the disadvantage that it requires the use and handling of corrosive nitric acid. Moreover, all methods require the handling of the respective chemicals in an aqueous medium resulting in the formation of a hydrated lithium salt, which must then be dried to remove water. If one chooses to evaporate and crystallize above 60° C. one can form the anhydrous salt, however, the high solubility of the nitrate requires considerable evaporation and the removal of the mother liquor from the crystals, followed by a drying step to be sure the salt is anhydrous.

I propose to prepare lithium nitrate in the molten state insuring the formation of the completely anhydrous salt as follows:

$$Li_2CO_3 + 2NH_4NO_3 \xrightarrow{235°C.} 2LiNO_3 + 2NH_3 + CO_2 + H_2O \quad (4)$$

If one compares this system with Equations 1, 2 and 3, it will be seen that 2 and 4 compare favorably with regard to the water balance but that 4 has the advantage that no violent exothermic reaction is invovled nor is any hydrate formed.

My proposed process has, therefore, several advantages over previously proposed methods. They are:

(1) Uses readily available chemical raw raterials in their industrially available form; $LiOH \cdot H_2O$, $NH_4NO_3$, or aqueous $HNO_3$.

(2) Considerably less water evaporation required since very little reaction water is formed and advantage is taken of the low solubility of lithium carbonate.

(3) No hydrated product is formed requiring vacuum or extreme drying times.

(4) Process readily conducted on a large scale continuous basis.

(5) Corrosive material handling and operations are limited to one section of the plant minimizing the quantity of corrosion resistant equipment required.

(6) Any closed plant cycle requires an impurity blow down stream. The chemical efficiency of my proposed process is high, since the blow down stream takes place with a stream containing very little lithium; namely, insoluble lithium carbonate. Any process using an aqueous stream cycle containing $LiNO_3$ loses considerable lithium, since lithium nitrate is very soluble.

(7) Technical LiOH, $Li_2CO_3$, $NH_4NO_3$, or $HNO_3$ acid contain coloring matter which can give an off color product. Reacting these materials at elevated temperatures oxidizes the organics to carbon dioxide giving a white product.

A flow sheet and material balance for the process are presented in the single figure in the drawing. Although I describe particular types of equipment, these are not critical in that different types may be substituted by those skilled in the art. I have run the process on both a batch and continuous basis absorbing the carbon dioxide and ammonia using commercially available raw materials.

Solid lithium carbonate and ammonium nitrate are mixed in a screw feeder 6. This mixture drops into a molten heel of lithium nitrate maintained at 230°–250° C. in a reactor 7. Reaction takes place liberating $NH_3$, $CO_2$ and water vapor. The molten lithium nitrate drops on hot crushing rolls 8 maintained at a temperature in excess of 100° C. The nitrate is reduced in size in a pug mill 9. The ground product is sized on screen 10, oversized being returned to the crusher, the undersized to the reactor and the product being recovered as desired.

The exhaust gas is passed through a lithium hydroxide scrubber 11, which selectively removes carbon dioxide as lithium carbonate, which is removed through line 12 to a centrifuge 14. Wet solids from the centrifuge are dried in flash drier 16 and returned as make up lithium carbonate. The liquid stream from the centrifuge contains a small amount of carbonate and this stream is sent to the lithium hydroxide dissolver 17 as a portion can be removed to prevent impurities from accumulating or to control the water balance. The lithium hydroxide stream is fed by pump 18 to the filter 19 and thence to absorber 11.

The exhausted ammonia can be combined with nitric acid and converted to $NH_4NO_3$ and returned to the reactor if desired.

A typical example illustrating the practice of this invention is as follows:

Example I

| | Batch |
|---|---|
| $Li_2CO_3$ (lbs.) | 536 |
| $NH_4NO_3$ (lbs.) | 1161 |
| Mol ratio ($NH_4NO_3/Li_2CO_3$) | 2.0 |
| Reaction time (min.) | 90 |
| Reactor temperature (0° C.) | 237 |
| Product (lbs.) | 1000 |
| $NH_3$ recovered (lbs.) | |
| Rate of conversion (percent/min.) | 1.0 |
| Product purity (percent) | 99.9 |
| Yield (percent) | 98.0 |

A typical chemical analysis of the product from the above process is given below:

Example II

| Compound: | Wt. percent |
|---|---|
| $LiNO_3$ | 99.99 |
| $NH_4NO_3$ | Nil |
| $Li_2CO_3$ | Nil |
| | 99.99 |

I claim:
1. A process for manufacture of lithium nitrate comprising reacting anhydrous lithium carbonate and anhydrous ammonium nitrate at 230°–250° C. to form lithium nitrate.
2. A process for manufacture of lithium nitrate comprising reacting anhydrous lithium carbonate and anhydrous ammonium nitrate in the molten state to form lithium nitrate substantially in accordance with the equation:

$$Li_2CO_3 + 2NH_4NO_3 \rightarrow 2LiNO_3 + 2NH_3 + CO_2 + H_2O$$

3. A process for manufacture of lithium nitrate comprising adding a mixture of anhydrous lithium carbonate and anhydrous ammonium nitrate to a molten mass of lithium nitrate maintained at a temperature sufficient to melt said lithium carbonate and ammonium nitrate to form additional lithium nitrate.
4. A process for the manufacture of lithium nitrate comprising reacting anhydrous lithium carbonate and anhydrous ammonium nitrate at a temperature of about 235° C. to form lithium nitrate.
5. A process for the manufacture of lithium nitrate comprising adding a mixture of anhydrous lithium carbonate and anhydrous ammonium nitrate to a mass of lithium nitrate maintained at a temperature of about 230°–250° C. to form additional lithium nitrate.

References Cited in the file of this patent
UNITED STATES PATENTS

| | | |
|---|---|---|
| 2,106,168 | Denny | Jan. 25, 1938 |
| 2,413,644 | Nicholson | Dec. 31, 1946 |
| 2,535,989 | Stengel | Dec. 26, 1950 |